United States Patent
Nakade

(10) Patent No.: US 10,894,540 B2
(45) Date of Patent: Jan. 19, 2021

(54) VEHICLE CONTROL APPARATUS

(71) Applicant: TOYOTA JIDOSHA KABUSHIKI KAISHA, Toyota (JP)

(72) Inventor: Yusuke Nakade, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 144 days.

(21) Appl. No.: 16/127,639

(22) Filed: Sep. 11, 2018

(65) Prior Publication Data

US 2019/0084557 A1     Mar. 21, 2019

(30) Foreign Application Priority Data

Sep. 15, 2017 (JP) .................................. 2017-178360

(51) Int. Cl.
*B60W 10/18* (2012.01)
*B60W 30/06* (2006.01)
*B62D 15/02* (2006.01)
*B60W 50/14* (2020.01)

(52) U.S. Cl.
CPC ............ *B60W 30/06* (2013.01); *B60W 10/18* (2013.01); *B60W 50/14* (2013.01); *B62D 15/0285* (2013.01)

(58) Field of Classification Search
CPC .. B60W 10/18; B60W 30/06; B60W 2520/04; B62D 15/0285
See application file for complete search history.

(56) References Cited

U.S. PATENT DOCUMENTS

| | | | |
|---|---|---|---|
| 6,223,847 B1 | 5/2001 | Shimizu et al. | |
| 2006/0052926 A1* | 3/2006 | Okada | B60T 7/12 701/51 |
| 2009/0178869 A1* | 7/2009 | Doll | B60K 31/00 180/170 |
| 2014/0121930 A1* | 5/2014 | Allexi | B60W 30/06 701/70 |
| 2019/0070957 A1* | 3/2019 | Nakatsuka | B60K 28/06 |

FOREIGN PATENT DOCUMENTS

| | | | | |
|---|---|---|---|---|
| DE | 102011114803 A1 * | 4/2013 | ............ | B60T 13/662 |
| JP | H11-001177 A | 1/1999 | | |
| JP | 2003-220937 A | 8/2003 | | |

* cited by examiner

*Primary Examiner* — Anshul Sood
(74) *Attorney, Agent, or Firm* — Oliff PLC

(57) ABSTRACT

A vehicle control apparatus includes: a brake control portion which is configured, when a vehicle is stopped, to cause a braking apparatus to keep a stopped state in which the vehicle is held stopped independently of operation of a brake pedal of the vehicle; a driver-assistance control portion which is configured to start a driver assistance operation in response to a manual operation made by the operator, and which is configured, when the stopped state is kept by the brake control portion, to withhold start of the driver assistance operation; and a withhold cancel portion which is configured, when a returning operation of the brake pedal has been made by the operator, to cause the driver-assistance control portion to cancel withhold of the start of the driver assistance operation.

7 Claims, 3 Drawing Sheets

VEHICLE CONTROL APPARATUS

This application claims priority from Japanese Patent Application No. 2017-178360 filed on Sep. 15, 2017, the disclosure of which is herein incorporated by reference in its entirety.

FIELD OF THE INVENTION

The present invention relates to a control apparatus for a vehicle, and more particularly to a technique to control start of a driver assistance operation when the vehicle is held in its stopped state.

BACKGROUND OF THE INVENTION

There is known a control apparatus for a vehicle, which is configured to keep the vehicle in its stopped state in which the vehicle is held stopped independently of operation of a brake pedal made by an operator of the vehicle, when given conditions are satisfied. A control apparatus, which is disclosed in JP-2003-220937A, is an example of such a control apparatus. In the disclosed control apparatus, when the vehicle operator has kept depressing the brake pedal for at least a given length of time with a running speed of the vehicle being zero, the vehicle is held in the stopped state by a braking apparatus even if the depression of the brake pedal is released. Then, when an accelerator pedal is depressed by the operator, the stopped state of the vehicle is cancelled whereby the vehicle is allowed to run.

SUMMARY OF THE INVENTION

In a case where the vehicle is capable of performing a driver assistance operation such as an automatic parking operation, it might be possible to control start of the driver assistance operation, such that the start of the driver assistance operation is withheld when an operation to start the driver assistance operation is made by the operator for, for example, a driving apparatus of the vehicle during the stopped state (in which the vehicle is held as described above), and such that the driver assistance operation is started when the accelerator pedal is depressed by the operator, as in JP-2003-220937A in which the stopped state of the vehicle is cancelled when the accelerator pedal is depressed by the operator, as described above.

However, if the driver assistance operation is started by the depressing operation of the accelerator pedal, the vehicle operator could be given an uncomfortable feeling such as a so-called vehicle jump-out feeling by the start of the driver assistance operation.

The present invention was made in view of the background art described above. It is therefore an object of the present invention to provide a control apparatus for a vehicle that is capable of holding its stopped state, wherein the control apparatus is capable of starting a driver assistance operation without giving the operator an uncomfortable feeling such as a vehicle jump-out feeling.

The object indicated above is achieved according to the following aspects of the present invention.

According to a first aspect of the invention, there is provided a control apparatus for a vehicle, which includes: a brake control portion which is configured, when the vehicle is stopped, to cause a braking apparatus of the vehicle to keep a stopped state of the vehicle in which the vehicle is held stopped independently of operation of a brake pedal of the vehicle made by an operator of the vehicle; a driver-assistance control portion which is configured to start a driver assistance operation in response to a manual operation made by the operator, and which is configured, when the stopped state is kept by the brake control portion, to inhibit or withhold start of the driver assistance operation; and a withhold cancel portion which is configured, when a returning operation of the brake pedal has been made by the operator, to cause the driver-assistance control portion to cancel inhibition or withhold of the start of the driver assistance operation.

According to a second aspect of the invention, in the control apparatus according to the first aspect of the invention, a stopped-state cancel portion is provided to cause the brake control portion to cancel the stopped state of the vehicle, when the brake pedal is placed in a depressed state by the operator while the start of the driver assistance operation is withheld by the driver-assistance control portion with the stopped state of the vehicle being kept by the brake control portion.

According to a third aspect of the invention, in the control apparatus according to the second aspect of the invention, the withhold cancel portion is configured to cause the driver-assistance control portion to cancel the withhold of the start of the driver assistance operation, when the returning operation of the brake pedal has been made by the operator, after cancel of the stopped state by the stopped-state cancel portion.

According to a fourth aspect of the invention, in the control apparatus according to any one of the first through third aspects of the invention, a notification control portion is provided to be configured, when the start of the driver assistance operation is withheld by the driver-assistance control portion with the stopped state being kept by the brake control portion, to cause an informing device of the vehicle to remind the operator to make a depressing operation of the brake pedal if the brake pedal is not placed in the depressed state by the operator.

According to a fifth aspect of the invention, in the control apparatus according to any one of the first through fourth aspects of the invention, the brake control portion is configured to cause the braking apparatus to keep the sopped state of the vehicle, through (i) a brake hold control by which a hydraulically-operated wheel brake as the braking apparatus is to be actuated, or (ii) an electric parking-brake control by which an electric parking brake as the braking apparatus is to be actuated.

According to a sixth aspect of the invention, in the control apparatus according to any one of the first through fifth aspects of the invention, the driver assistance operation includes an intelligent parking-assisting operation, an automatic parking operation and/or a cruise controlling operation, namely, the driver assistance includes an intelligent parking-assisting function, an automatic parking function and/or a cruise controlling function.

In the control apparatus according to the first aspect of the invention, the withhold cancel portion is provided to be configured, when the returning operation of the brake pedal has been made by the operator, to cause the driver-assistance control portion to cancel inhibition or withhold of the start of the driver assistance operation. Thus, since the driver assistance operation is started by the returning operation of the brake pedal made by the operator, an uncomfortable feeling such as a vehicle jump-out feeling is never given to the operator.

In the control apparatus according to the second aspect of the invention, the stopped-state cancel portion is provided to cause the brake control portion to cancel the stopped state of the vehicle, when the brake pedal is placed in the depressed state by the operator while the start of the driver assistance operation is withheld by the driver-assistance control portion with the stopped state of the vehicle being kept by the brake control portion. Thus, the stopped state is cancelled by the stopped-state cancel portion when the brake pedal is placed in the depressed state by the operator. However, even after the stopped state has been cancelled, the vehicle is held substantially stopped based on the brake pedal placed in the depressed state, so that an uncomfortable feeling such as a vehicle jump-out feeling is never given to the operator.

In the control apparatus according to the third aspect of the invention, the withhold cancel portion is configured to cause the driver-assistance control portion to cancel the withhold of the start of the driver assistance operation, when the returning operation of the brake pedal has been made by the operator, after cancel of the stopped state by the stopped-state cancel portion. Thus, after the stopped state of the vehicle has been cancelled by the stopped-state cancel portion, the driver assistance operation is started by the returning operation of the brake pedal by the operator. Owing to this arrangement, a transition of a driving state of the vehicle is made smoothly from the stopped state of the vehicle to the start of the driver assistance operation.

In the control apparatus according to the fourth aspect of the invention, the notification control portion is provided to be configured, when the start of the driver assistance operation is withheld by the driver-assistance control portion with the stopped state being kept by the brake control portion, to cause an informing device of the vehicle to remind the operator to make a depressing operation of the brake pedal if the brake pedal is not placed in the depressed state by the operator. Thus, when the brake pedal is not placed in the depressed state by the operator, the notification is made to remind the operator to make the depressing operation of the brake pedal. This arrangement assures the operator to make the depressing operation of the brake pedal without forgetting to make it, whereby the stopped state of the vehicle is cancelled. Then, the driver assistance operation is started by the returning operation of the brake pedal which follows the placement of the brake pedal into the depressed state.

In the control apparatus according to the fifth aspect of the invention, the brake control portion is configured to cause the braking apparatus to keep the sopped state of the vehicle, through the brake hold control or the electric parking-brake control. Thus, the driver assistance operation is started by the returning operation of the brake pedal by the operator, in either of (i) a case where the stopped state of the vehicle is kept by the brake hold control by which a hydraulic pressure of a hydraulic circuit controlling the wheel brake is kept substantially the same level and (ii) a case where the stopped state of the vehicle is kept by the electric parking-brake control by which the parking brake is operated by an electric motor rather than a manpower.

In the control apparatus according to the sixth aspect of the invention, the driver assistance operation includes the intelligent parking-assisting operation, the automatic parking operation and/or the cruise controlling operation. Thus, the driver assistance operation is started at an appropriate timing by the returning operation of the brake pedal by the operator, no matter which one or ones of the intelligent parking-assisting operation, automatic parking operation and cruise controlling operation are included in the driver assistance operation.

DETAILED DESCRIPTION OF PREFERRED EMBODIMENT

Embodiment

Hereinafter, an electronic control apparatus 70 for a vehicle 100, which is an embodiment of the present invention, will be described in detail with reference to the accompanying drawings.

Figure 1:
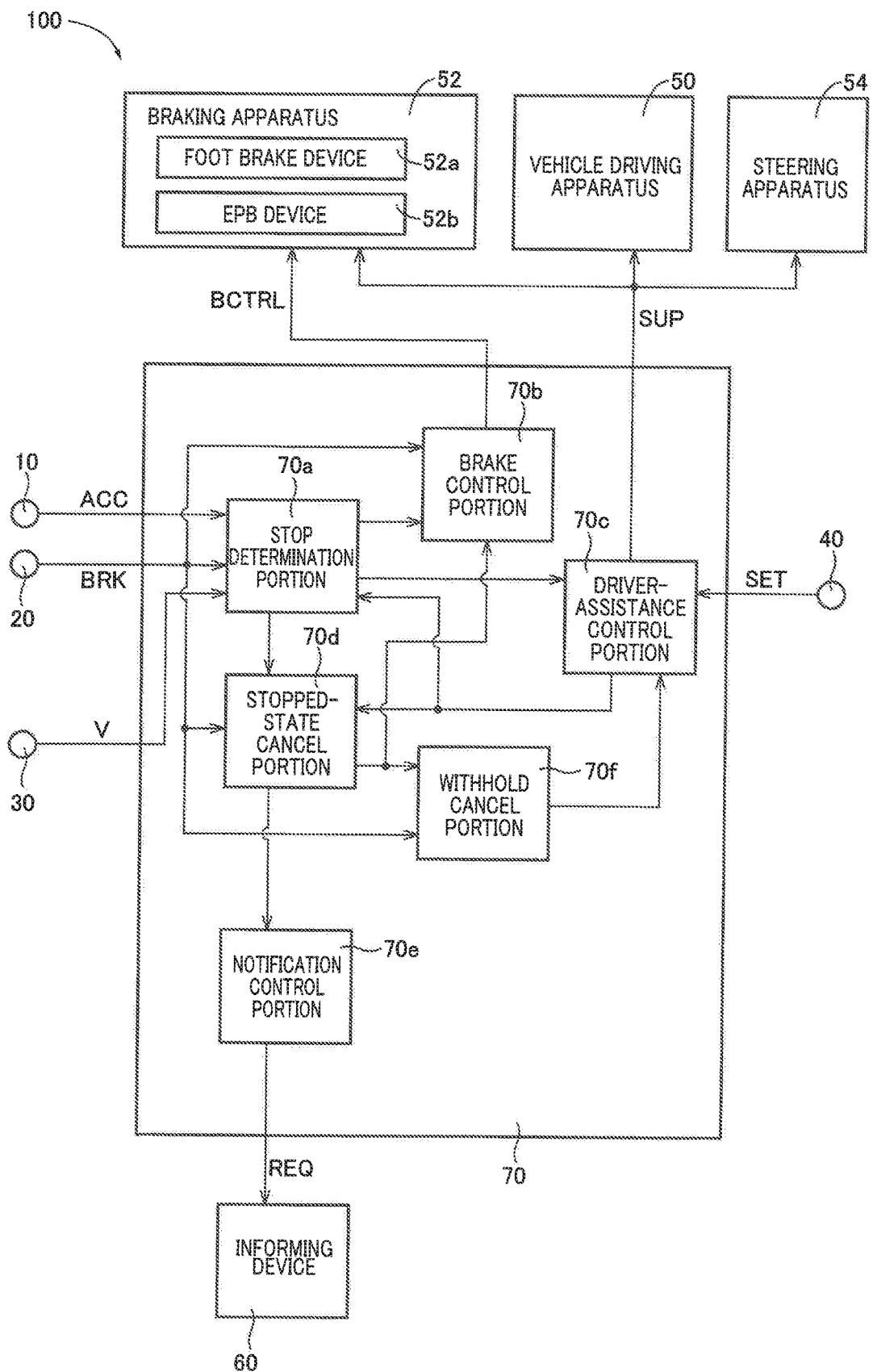
FIG. 1 is a block diagram showing major control functions of a vehicle control apparatus according to an embodiment of the invention.

FIG. 1 is a block diagram showing major control functions of the electronic control apparatus (electronic control unit) 70 for the vehicle 100. The vehicle 100 has an acceleration operating member in the form of an accelerator pedal 10 and a brake operating member in the form of a brake pedal 20, but does not have a clutch pedal. The vehicle 100 includes an automatic transmission (not shown) that is constituted mainly by a torque convertor and at least one planetary gear device.

The electronic control apparatus 70, which corresponds to a control apparatus recited in the appended claims, is constituted by a so-called microcomputer, and controls various apparatuses and devices by processing input signals in accordance with pre-stored programs. The electronic control apparatus 70 includes a stop determination portion 70$a$, a brake control portion 70$b$, a driver-assistance control portion 70$c$, a stopped-state cancel portion 70$d$, a notification control portion 70$e$ and a withhold cancel portion 70$f$.

As described below, the vehicle 100 has a function of holding a stopped state of the vehicle 100 by a so-called brake hold control in which, for example, a brake actuator controls a hydraulic pressure of a hydraulic circuit that controls a wheel brake such that the hydraulic pressure of the hydraulic circuit is maintained in the stopped state of the vehicle 100. Alternatively, the vehicle 100 has a function of holding the stopped state of the vehicle 100 by a so-called electric parking-brake control in which, for example, a parking brake is operated by an electric motor. Hereinafter, the state in which the stopped state of the vehicle 100 is held by the brake hold control will be referred to as "a brake hold state", while the state in which the stopped state of the vehicle 100 is held by the electric parking-brake control will be referred to as "an electric parking-brake operating state".

The stop determination portion 70$a$ receives various input signals such as an accelerator-pedal stroke signal ACC which is supplied from a sensor disposed in the accelerator pedal 10 and which represents an amount of depression of the accelerator pedal 10, a brake-pedal stroke signal BRK which is supplied from a sensor disposed in the brake pedal 20 and which represents an amount of depression of the brake pedal 20, and a running speed signal V which is supplied from a vehicle speed sensor 30 and which represents a running speed of the vehicle 100. The stop determination portion 70$a$ is configured to determine whether a brake-pedal ON state (i.e., a depressed state in which the brake pedal 20 is depressed) has been kept for at least given length of time (e.g., 3 seconds) with the vehicle 100 being stopped and with the accelerator pedal 10 being in a released or returned state. The stop determination portion 70a makes this determination, based on the running speed signal V, the accelerator-pedal stroke signal ACC and the brake-pedal stroke signal BRK. Described specifically, it is determined that the vehicle 100 is stopped when a running speed of the vehicle 100 represented by the running speed signal V is zero. It is determined that the accelerator pedal 10 is in the returned state when the amount of depression of the accelerator pedal 10 represented by the accelerator-pedal stroke signal ACC is not larger than a predetermined threshold value. It is determined that the brake pedal 20 is in the depressed state when the amount of depression of the brake pedal 20 represented by the brake-pedal stroke signal BRK is larger than a predetermined threshold value. It is noted that the accelerator pedal 10 is determined to be in a depressed state when the amount of depression of the accelerator pedal 10 is larger than the predetermined threshold value, and that the brake pedal 20 is determined to be in a released or returned state when the amount of depression of the brake pedal 20 is not larger than the predetermined threshold value. An operation to cause each of the accelerator pedal 10 and the brake pedal 20 to be placed into the depressed state from the returned state is referred to as "a depressing operation". An operation to cause each of the accelerator pedal 10 and the brake pedal 20 to be placed into the returned state from the depressed state is referred to as "a releasing or returning operation". It is further noted that the predetermined threshold value regarding the accelerator pedal 10 and the predetermined threshold value regarding the brake pedal 20 are not necessarily the same as each other.

When start of an operation of a driver assistance (that will be described below) is not withheld by the driver-assistance control portion 70c with the brake hold state or the electric parking-brake operating state being kept by the brake control portion 70b, the stop determination portion 70a determines whether the accelerator pedal 10 is in the depressed state or not, based on the accelerator-pedal stroke signal ACC. When the start of the operation of the driver assistance (hereinafter referred to as "driver assistance operation") is withheld by the driver-assistance control portion 70c with the brake hold state or the electric parking-brake operating state being kept by the brake control portion 70b, the stop determination portion 70a does not make this determination as to whether the accelerator pedal 10 is in the depressed state or not. There is a case where the driver assistance operation is switched from its invalid state to its valid state in response to operation of a setting switch 40 by the vehicle operator during the brake hold state or the electric parking-brake operating state. In this case, the stopped state of the vehicle 100 is cancelled and the driver assistance operation is started, depending on operation of the brake pedal 20, as described below, rather than depending on operation of the accelerator pedal 10.

The brake control portion 70b receives the brake-pedal stroke signal BRK. When it is not determined by the stop determination portion 70a that the brake pedal 20 has been in the depressed state for at least the given length of time, with the vehicle 100 being stopped and with the accelerator pedal 10 being in the returned state, the brake control portion 70b supplies, to the braking apparatus 52, a brake control signal BCTRL that causes the vehicle 100 to be decelerated or stopped depending on the amount of depression of the brake pedal 20 that is represented by the brake-pedal stroke signal BRK. The braking apparatus 52 may include a foot brake device 52a and/or an electric parking brake device (EPB device) 52b. The foot brake device 52a includes, for example, the wheel brake configured to brake each wheel of the vehicle 100 in accordance with the depressing operation of the brake pedal 20, the hydraulic circuit configured to control the wheel brake, and the brake actuator configured to control the hydraulic circuit. The electric parking brake device 52b is configured to hold the vehicle 100 stopped during parking of the vehicle 100.

When it is determined by the stop determination portion 70a that the brake pedal 20 has been in the depressed state for at least the given length of time, with the vehicle 100 being stopped and with the accelerator pedal 10 being in the returned state, the brake control portion 70b causes the braking apparatus 52 to execute the brake hold control or the electric parking-brake control. For execution of the brake hold control or the electric parking-brake control, the control portion 70b supplies, to the braking apparatus 52, the brake control signal BCTRL that causes the vehicle 100 to be held in the stopped state in which the vehicle 100 is held stopped independently of operation of the brake pedal 20 made by the operator, namely, the vehicle 100 is held stopped irrespective of presence or absence of the depressing operation of the brake pedal 20. In response to the brake control signal BCTRL, the braking apparatus 52 establishes the brake hold state by the foot brake device 52a or the electric parking-brake operating state by the EPB device 52b, for thereby keeping the stopped state of the vehicle 100.

When it is determined by the stop determination portion 70a that the brake pedal 20 is in the depressed state, in a case where the brake hold state or the electric parking-brake operating state is established by the brake control portion 70b, with the start of the driver assistance operation being not withheld by the driver-assistance control portion 70c, the brake control portion 70b causes the braking apparatus 52 to cancel the brake hold control or the electric parking-brake control. To this end, the brake control portion 70b supplies, to the braking apparatus 52, the brake control signal BCTRL that causes the vehicle 100 to be decelerated or stopped depending on the depressing operation amount of the brake pedal 20. When it is determined by the stop determination portion 70a that the brake pedal 20 is in the depressed state, in case where the brake hold state or the electric parking-brake operating state is established by the brake control portion 70b, with the start of the driver assistance operation being withheld by the driver-assistance control portion 70c, too, the brake control portion 70b causes the braking apparatus 52 to cancel the brake hold control or the electric parking-brake control. To this end, the brake control portion 70b supplies, to the braking apparatus 52, the brake control signal BCTRL that is based on the depressing operation amount of the brake pedal 20. Thus, when it is determined that the brake pedal 20 is in the depressed state, the stopped-state cancel portion 70d causes the brake control portion 70b to cancel the stopped state of the vehicle 100.

The driver-assistance control portion 70c receives a setting signal SET supplied from the setting switch 40, which is to be operated by the vehicle operator to place each of various functions or operations of the driver assistance operation into a selected one of the valid state and the invalid state. As the various operations of the driver assistance, there are so-called intelligent parking-assisting operation, automatic parking operation and cruise controlling operation, for example. The intelligent parking-assisting operation is executed to assist a steering operation of the operator in parallel parking or garage parking, namely, to assist the operator by a computer control to perform the steering operation required to park the vehicle 100 in a position, which is set as a target parking position by the operator, for example, on a monitor display. The automatic parking operation is executed, in addition to assisting the operator to park the vehicle 100 in the target parking position, to automatically set the target parking position after detecting a parking space, for guiding the vehicle 100 into the automatically-set target parking position. The cruise controlling operation is executed to control a running speed of the vehicle 100 such that the running speed is maintained at a desired speed determined by the operator, even without operation of the accelerator pedal 10 by the operator, and additionally to control throttle and brake of the vehicle 100 by computer such that a minimum safe distance with a preceding vehicle is maintained.

The setting switch 40 is a press button switch disposed near a seat of the vehicle operator. The setting switch 40 may be configured to switch the driver assistance operation from the valid state to the invalid state, or from the invalid state to the valid state, each time the setting switch 40 is operated or pressed. Alternatively, the setting switch 40 may be configured to select one of the various operations (such as the above-described intelligent parking-assisting operation, automatic parking operation and driver assistance operation) so as to place the selected operation in the valid state, each time the setting switch 40 is operated or pressed. Further, the setting switch 40 may include a plurality of switches that are provided to switch between the valid and invalid states of the respective various operations.

When it is determined by the withhold cancel portion 70*f* that the brake pedal 20 has been placed in the returned state in a case where it is not determined by the stop determination portion 70*a* that the brake pedal 20 has been in the depressed state for at least the given length of time, with the accelerator pedal 10 being in the returned state and with the vehicle 100 being stopped, after the setting signal SET that causes the driver assistance operation to be in the valid state has been supplied from the setting switch 40 to the driver-assistance control portion 70*c*, the driver-assistance control portion 70*c* supplies, to the vehicle driving apparatus 50, the braking apparatus 52 and a steering apparatus 54, an assistance control signal SUP that controls these apparatuses 50, 52, 54, for executing the driver assistance operation. The driver assistance operation is started with the supply of the assistance control signal SUP. The vehicle driving apparatus 50 includes a drive-force transmitting device configured to transmit a drive force generated by a prime mover such as an engine, toward wheels of the vehicle 100. The steering apparatus 54 is provided for changing a direction of running of the vehicle 100. The apparatuses 50, 52, 54 cooperate to move and stop the vehicle 100. With the assistance control signal SUP being supplied from the driver-assistance control portion 70*c* to the apparatuses 50, 52, 54, the apparatuses 50, 52, 54 are subjected to controls executed in accordance with the assistance control signal SUP, for performing the driver assistance operation such as the intelligent parking-assisting operation, automatic parking operation and cruise controlling operation.

In a case where it is determined by the stop determination portion 70*a* that the brake pedal 20 has been in the depressed state for at least the given length of time, with the accelerator pedal 10 being returned and with the vehicle 100 being stopped, after the setting signal SET that causes the driver assistance operation to be in the valid state has been supplied from the setting switch 40 to the driver-assistance control portion 70*c*, the driver-assistance control portion 70*c* withholds output of the assistance control signal SUP that is to be supplied to the above-described apparatuses 50, 52, 54 until it is determined by the withhold cancel portion 70*f* that the brake pedal 20 has been placed in the returned state. With the output of the assistance control signal SUP being withheld, the start of the driver assistance operation is withheld.

When it is determined by the withhold cancel portion 70*f* that the brake pedal 20 has been placed in the retuned state, the driver-assistance control portion 70*c* starts the output of the assistance control signal SUP that is to be supplied to the above-described apparatuses 50, 52, 54, even if the output of the assistance control signal SUP has been withheld. Thus, the withhold cancel portion 70*f* has a function of causing the driver-assistance control portion 70*c* to cancel the withhold of the start of the driver assistance operation, by determining that the brake pedal 20 in the depressed state.

The stopped-state cancel portion 70*d* receives the brake-pedal stroke signal BRK inputted thereto.

The stopped-state cancel portion 70*d* determines whether the brake pedal 20 is in the depressed state or not, based on the brake-pedal stroke signal BRK, when it is determined by the stop determination portion 70*a* that the brake pedal 20 has been in the depressed state for at least the given length of time, with the accelerator pedal 10 being in the returned state and with the vehicle 100 being stopped, in a case where the start of the driver assistance operation is withheld by the driver-assistance control portion 70*c*.

When it is determined by the stopped-state cancel portion 70*d* that the brake pedal 20 is not in the depressed state, the notification control portion 70*e* supplies, to an informing device 60, a reminder control signal REQ that causes the informing device 60 to provide the vehicle operator with information reminding the operator to make the depressing operation of the brake pedal 20.

When the reminder control signal REQ supplied from the notification control portion 70*e* is inputted to the informing device 60 that is disposed in an instrument panel of the vehicle 100, for example, the informing device 60 reminds the operator to make the depressing operation of the brake pedal 20, by means of display or sound, in accordance with the reminder control signal REQ. Thus, the stopped-state cancel portion 70*d* has a function of causing the informing device 60 to remind the operator to make the depressing operation of the brake pedal when the brake pedal 20 is not placed in the depressed state by the operator.

The withhold cancel portion 70*f* receives the brake-pedal stroke signal BRK inputted thereto.

When it is determined by the stopped-state cancel portion 70*d* that the brake pedal 20 is in the depressed state, the withhold cancel portion 70*f* determines whether the brake pedal 20 is in the returned state (brake pedal OFF) or not, based on the brake-pedal stroke signal BRK.

Figure 2:
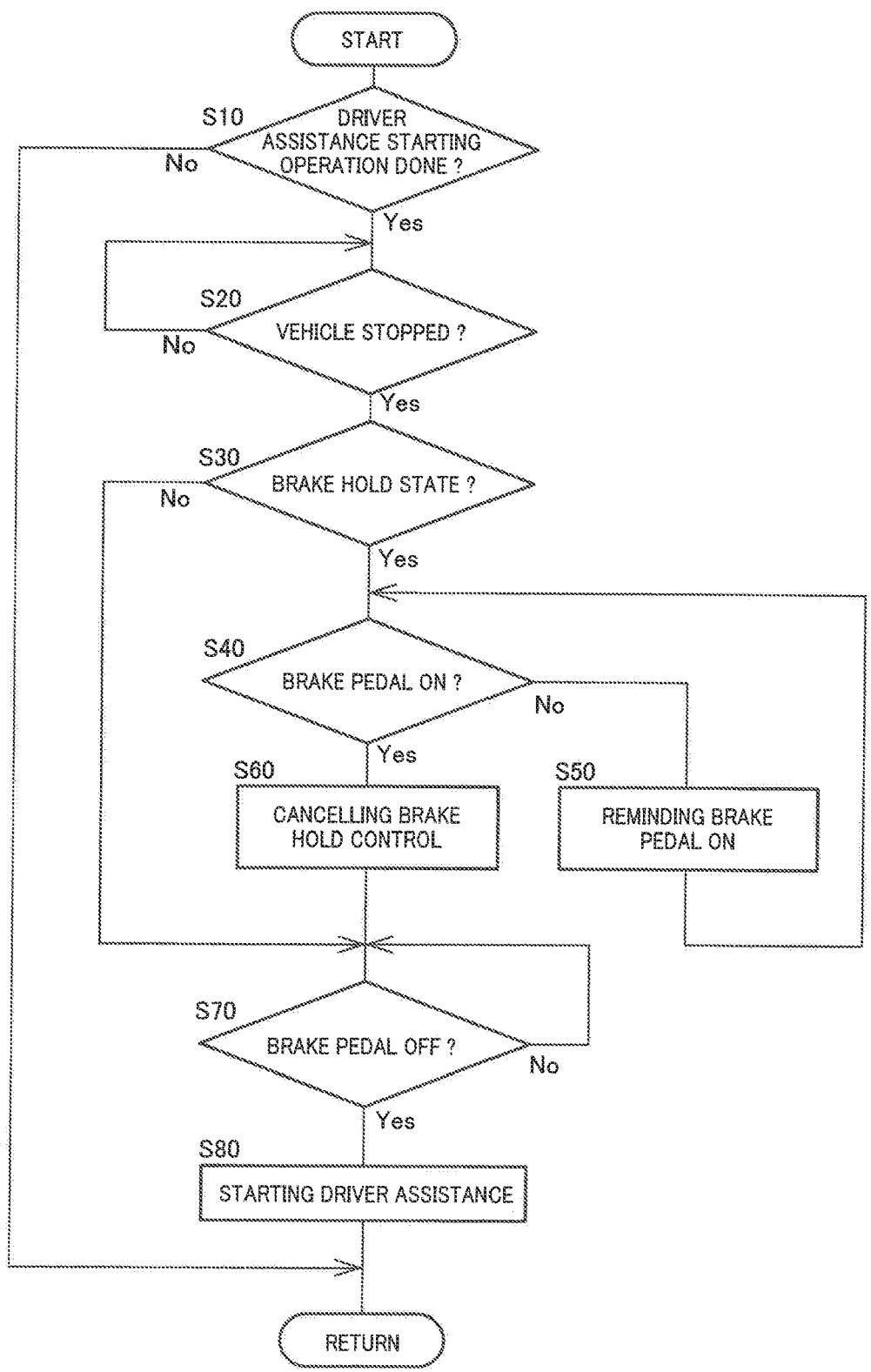
FIG. 2 is a flow chart illustrating an essential part of a main control routine executed by the control apparatus shown in FIG. 1, namely, a control routine that is executed for starting a driver assistance operation, by way of an example.

FIG. 2 is a flow chart illustrating an essential part of a main control routine executed by the electronic control apparatus 70 of the vehicle 100 shown in FIG. 1, namely, a control routine that is executed for starting the driver assistance operation, by way of an example. FIG. 2 shows a case where the stopped state of the vehicle 100 is kept by the brake hold control, by way of example.

The control routine of FIG. 2 is executed in the electronic control apparatus 70, for example, in a repeated manner. The second and subsequent cycles of execution of the control routine is started after the previous cycle of execution is completed by implementation of step S80 as a final step of the control routine.

The control routine of FIG. 2 is initiated with step S10 corresponding to the driver-assistance control portion 70*c*. At step S10, it is determined whether the operation to start the driver assistance operation has been made or not, namely, whether the setting signal SET supplied from the setting switch 40 represents that the driver assistance operation is in the valid state or not. When the setting signal SET represents that the driver assistance operation is in the valid state, an affirmative determination is made at step S10. When the setting signal SET represents that the driver assistance operation is in the invalid state, a negative determination is made at step S10. When the affirmative determination is made at step S10, step S20 is implemented. When the negative determination is made at step S10, one cycle of execution of the control routine is completed, and the control flow goes back to step S10 as a first step of the control routine.

At step S20 corresponding to the stop determination portion 70a, it is determined whether the vehicle 100 is stopped or not. When an affirmative determination is made at step S20, step S30 is implemented. When a negative determination is made at step S20, step S20 is implemented again. When the vehicle 100 is not stopped, if the driver assistance operation is switched, by operation of the setting switch 40 by the vehicle operator, from the invalid state to the valid state, the start of the driver assistance operation is withheld until the vehicle 100 is stopped.

At step S30 corresponding to the stopped-state cancel portion 70d, it is determined, for example, whether the vehicle 100 is in the brake hold state or not. When an affirmative determination is made at step S30, step S40 is implemented. When a negative determination is made at step S30, the control flow goes to step S70.

At step S40 corresponding to the stopped-state cancel portion 70d, it is determined whether the brake pedal 20 is in the depressed state or not. When an affirmative determination is made at step S40, step S60 is implemented. When a negative determination is made at step S40, the control flow goes to step S50.

At step S50 corresponding to the notification control portion 70e, the notification is made to remind the operator to make the depressing operation of the brake pedal 20. Then, step S40 is implemented again.

At step S60 corresponding to the stopped-state cancel portion 70d and the brake control portion 70b, the brake hold control is cancelled. Then, step S70 is implemented.

At step S70 corresponding to the withhold cancel portion 70f, it is determined whether the brake pedal 20 is in the retuned state or not. When an affirmative determination is made at step S70, step S80 is implemented. The affirmative determination made at step S70 means that the returning operation of the brake pedal 20 has been made by the operator. When a negative determination is made at step S70, step S70 is implemented again. It is noted that the state in which the start of the start of the driver assistance operation of the vehicle 100 is withheld at steps S40 through S70 corresponds to a state of the "withhold" of the start of the driver assistance operation recited in the appended claims.

At step S80 corresponding to the withhold cancel portion 70f and the driver-assistance control portion 70c, the driver assistance operation is started. With implementation of step S80, one cycle of execution of the control routine is completed, and the control flow goes back to step S10.

Figure 3:
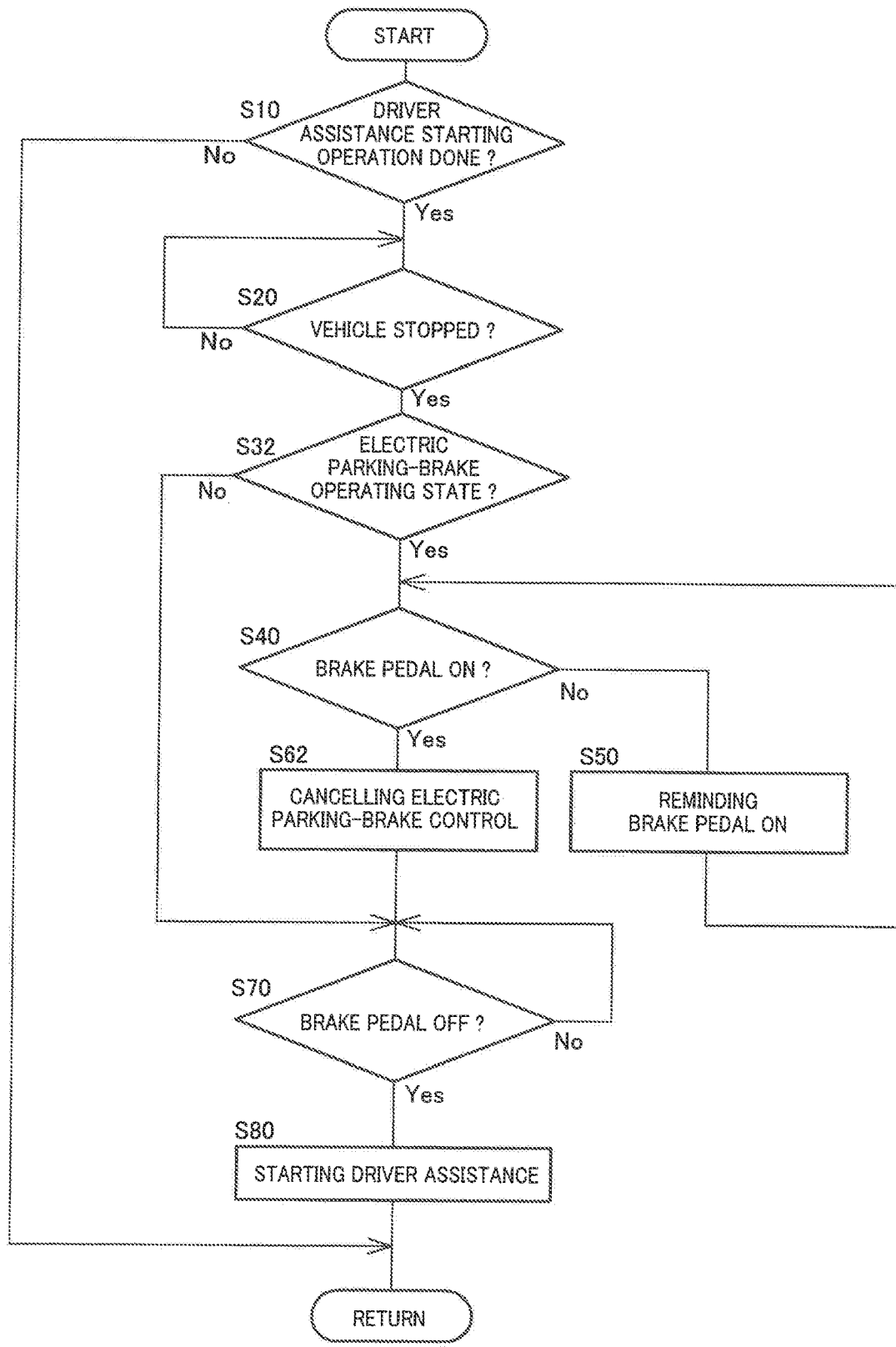
FIG. 3 is a flow chart illustrating an essential part of a main control routine executed by the control apparatus shown in FIG. 1, namely, a control routine that is executed for starting a driver assistance operation, by way of another example.

FIG. 3 is a flow chart illustrating an essential part of a main control routine executed by the electronic control apparatus 70 of the vehicle 100 shown in FIG. 1, namely, a control routine that is executed for starting the driver assistance operation, by way of another example. FIG. 3 shows a case where the stopped state of the vehicle 100 is kept by the electric parking-brake control, by way of example.

The control routine shown in FIG. 3 is substantially the same as the above-described control routine shown in FIG. 2 except for some steps that will be described below. The same reference signs as used in FIG. 2 will be used to identify the functionally corresponding steps, and descriptions thereof are not provided.

The control routine shown in FIG. 3 is executed in a repeated manner as the control routine shown in FIG. 2.

Step S10 in the control routine of FIG. 3 is substantially the same as step S10 in the control routine of FIG. 2.

At step S20 corresponding to the stop determination portion 70a, it is determined whether the vehicle 100 is stopped or not, as at step S20 in the control routine of FIG. 2. When an affirmative determination is made at step S20, step S30 is implemented. When a negative determination is made at step S20, step S20 is implemented again.

At step S32 corresponding to the stopped-state cancel portion 70d, it is determined whether the vehicle 100 is in electric parking-brake operating state or not. When an affirmative determination is made at step S32, step S40 is implemented. When a negative determination is made at step S32, the control flow goes to step S70.

At step S40 corresponding to the stopped-state cancel portion 70d, it is determined whether the brake pedal 20 is in the depressed state or not, as at step S40 in the control routine of FIG. 2. When an affirmative determination is made at step S40, step S62 is implemented. When a negative determination is made at step S40, the control flow goes to step S50.

Step S50 in the control routine of FIG. 3 is substantially the same as step S50 in the control routine of FIG. 2.

At step S62 corresponding to the stopped-state cancel portion 70d and the brake control portion 70b, the electric parking-brake control is cancelled. Then, step S70 is implemented.

Steps S70 and S80 in the control routine of FIG. 3 are substantially the same as steps S70 and S80 in the control routine of FIG. 2.

In the electronic control apparatus 70 according to the present embodiment, the withhold cancel portion 70f is configured to cause the driver-assistance control portion 70c to cancel withhold of the start of the driver assistance operation, when the returning operation of the brake pedal 20 has been made by the operator after the brake pedal 20 had been in the depressed state. Thus, since the driver assistance operation is started by the returning operation of the brake pedal 20 from the depressed state, which is made by the operator, namely, since the operator can select a desired point of time at which the driver assistance operation is to be started, an uncomfortable feeling such as the vehicle jump-out feeling is never given to the operator.

In the electronic control apparatus 70 according to the present embodiment, the stopped-state cancel portion 70d is provided to cause the brake control portion 70b to cancel the stopped state of the vehicle 100, when the brake pedal 20 is placed in the depressed state by the operator while the start of the driver assistance operation is withheld by the driver-assistance control portion 70c with the stopped state of the vehicle 100 being kept by the brake control portion 70b. Thus, the stopped state is cancelled by the stopped-state cancel portion 70d when the brake pedal 20 is placed in the depressed state by the operator. However, even after the stopped state has been cancelled, the vehicle 100 is held substantially stopped based on the brake pedal 20 placed in the depressed state, so that an uncomfortable feeling such as the vehicle jump-out feeling is never given to the operator.

In the electronic control apparatus 70 according to the present embodiment, the withhold cancel portion 70*f* is configured to cause the driver-assistance control portion 70*c* to cancel the withhold of the start of the driver assistance operation, when the returning operation of the brake pedal 20 has been made by the operator, after cancel of the stopped state by the stopped-state cancel portion 70*d*. Thus, after the stopped state of the vehicle 100 has been cancelled by the stopped-state cancel portion 70*d*, the driver assistance operation is started by the returning operation of the brake pedal 20 by the operator. Owing to this arrangement, a transition of the driving state of the vehicle 100 is made smoothly from the stopped state of the vehicle 100 to the start of the driver assistance operation.

In the electronic control apparatus 70 according to the present embodiment, the notification control portion 70*e* is configured, when the start of the driver assistance operation is withheld by the driver-assistance control portion 70*c* with the stopped state being kept by the brake control portion 70*b*, to cause the informing device 60 to remind the operator to make a depressing operation of the brake pedal 20 if the brake pedal 20 is not placed in the depressed state by the operator. Thus, when the brake pedal 20 is not placed in the depressed state by the operator, the notification is made to remind the operator to make the depressing operation of the brake pedal 20. This arrangement assures the operator to make the depressing operation of the brake pedal 20 without forgetting to make it, whereby the stopped state of the vehicle 100 is cancelled. Then, the driver assistance operation is started by the returning operation of the brake pedal 20 which follows the placement of the brake pedal 20 into the depressed state.

In the electronic control apparatus 70 according to the present embodiment, the driver assistance operation is started by the returning operation of the brake pedal 20 by the operator, in either of (i) a case where the stopped state of the vehicle 100 is kept by the brake hold control and (ii) a case where the stopped state of the vehicle 100 is kept by the electric parking-brake control, as shown in the flow charts of FIGS. 2 and 3, by way of examples.

In the electronic control apparatus 70 according to the present embodiment, the driver assistance operation is started at an appropriate timing by the returning operation of the brake pedal 20 by the operator, no matter which one or ones of the intelligent parking-assisting operation, automatic parking operation and cruise controlling operation are included in the driver assistance operation.

While the preferred embodiment of this invention has been described in detail by reference to the drawings, it is to be understood that the invention may be otherwise embodied.

In the above-described embodiment, when the brake pedal 20 is placed in the depressed state by the vehicle operator while the start of the driver assistance operation is withheld by the driver-assistance control portion 70*c*, the stopped-state cancel portion 70*d* cancels the stopped state of the vehicle 100 that has been held by the brake control portion 70*b*. It should be understood that the placement of the brake pedal 20 in the depressed state encompasses a case where the brake pedal 20 has been placed from the returned state to the depressed state and also a case where the depressed state of the brake pedal 20, by which the brake hold control or the electric parking-brake control had been executed in the braking apparatus 52, has been maintained. Therefore, when the brake pedal 20 has been held in the depressed state even during the brake hold state or the electric parking-brake operating state, the withhold cancel portion 70*f* causes the driver-assistance control portion 70*c* to start the driver assistance operation, with only the returning operation of the brake pedal 20.

In the above-described embodiment, in a case where the start of the driver assistance operation is withheld by the driver-assistance control portion 70*c*, the stopped-state cancel portion 70*d* cancels the stopped state of the vehicle 100 held by the brake control portion 70*b* when the brake pedal 20 is placed in the depressed state by the operator. However, for example, the stopped-state cancel portion 70*d* may cancel the stopped state of the vehicle 100 kept by the brake control portion 70*b* when the returning operation of the brake pedal 20 from the depressed state is made.

In the above-described embodiment, after the stopped state of the vehicle 100 kept by the brake control portion 70*b* is cancelled by stopped-state cancel portion 70*d* (at step S60 in FIG. 2 or at step S62 in FIG. 3), the driver assistance operation is started (at step S80 in FIGS. 2 and 3). However, for example, the cancel of the stopped state of the vehicle 100 held by the brake control portion 70*b* and the start of the driver assistance operation by the driver-assistance control portion 70*c* may be made concurrently with each other at a certain point of time when the returning operation of the brake pedal 20 from the depressed state has been made by the operator. For example, the cancel of the stopped state of the vehicle 100 kept by the brake control portion 70*b* and the start of the driver assistance operation by the driver-assistance control portion 70*c* may be made concurrently with each other, when the withhold cancel portion 70*f* determines that the brake pedal 20 is placed in the returned state, rather than when the stopped-state cancel portion 70*d* determines that the brake pedal 20 is placed in the depressed state. Further, the stopped state of the vehicle 100 kept by the brake control portion 70*b* may be cancelled even after the start of the driver assistance operation, as long as a load applied to the braking apparatus 52 is within a range tolerable in the braking apparatus 52.

In the above-described embodiment, the notification control portion 70*e* is provided to cause the informing device 60 to remind the operator to make the depressing operation of the brake pedal 20 when the brake pedal 20 is not placed in the depressed state by the operator. However, even without this arrangement, it is possible to enjoy the technical advantage of the present invention, which is that the driver assistance operation can be started without a vehicle jump-out feeling being given to the operator, as long as the depressing operation and the returning operation of the brake pedal 20 are made voluntarily by the operator. Further, in the above-described embodiment, the stopped state of the vehicle 100 is kept when three conditions are satisfied, wherein the three condition consists of (i) a condition that the vehicle 100 is stopped, (ii) a condition that the accelerator pedal 10 is in the returned state and (iii) a condition that the brake pedal 20 has been in the depressed state for at least the given length of time. However, the condition that the accelerator pedal 10 is in the returned state is not essential, because it is considered that the accelerator pedal 10 is in the returned when the brake pedal 20 has been in the depressed state for at least the given length of time.

In the above-described embodiment, the internal combustion engine constitutes a drive force source configured to generate the drive force driving the wheels of the vehicle 100. However, the drive force may be constituted by an electric motor configured to generate a torque by an electric energy as in an electric vehicle. Further, the vehicle may be equipped with a hybrid system having both of the internal combustion engine and the electric motor as the drive force sources.

It is to be understood that the embodiment described above is given for illustrative purpose only, and that the present invention may be embodied with various modifications and improvements which may occur to those skilled in the art.

NOMENCLATURE OF ELEMENTS

20: brake pedal
30: vehicle speed sensor
40: setting switch
50: vehicle driving apparatus
52: braking apparatus
70: electronic control apparatus (control apparatus)
70b: brake control portion
70c: driver-assistance control portion
70d: stopped-state cancel portion
70e: notification control portion
70f: withhold cancel portion
60: informing device
100: vehicle

What is claimed is:

1. A control apparatus for a vehicle, comprising:
a processor programmed to
when the vehicle is stopped, cause a braking apparatus of the vehicle to keep a stopped state of the vehicle in which the vehicle is held stopped independently of operation of a brake pedal of the vehicle made by an operator of the vehicle;
start a driver assistance operation in response to a manual operation made by the operator, and which is configured, when the stopped state is kept by the processor, to withhold a start of the driver assistance operation;
cancel the stopped state of the vehicle, when the brake pedal is placed in a depressed state by the operator while the start of the driver assistance operation is withheld by said processor with the stopped state of the vehicle being kept by said processor; and
when a returning operation of the brake pedal has been made by the operator, cancel the withhold of the start of the driver assistance operation.

2. The control apparatus according to claim 1, wherein said processor is programmed to cancel the withhold of the start of the driver assistance operation, when the returning operation of the brake pedal has been made by the operator, after cancel of the stopped state by said processor.

3. The control apparatus according to claim 1, wherein said processor is further programmed to, when the start of the driver assistance operation is withheld by said processor with the stopped state being kept by said processor, cause an informing device of the vehicle to remind the operator to make a depressing operation of the brake pedal if the brake pedal is not placed in the depressed state by the operator.

4. The control apparatus according to claim 1, wherein said processor is configured to cause the braking apparatus to keep the stopped state of the vehicle, through (i) a brake hold control by which a hydraulically-operated wheel brake as the braking apparatus is to be actuated, or (ii) an electric parking-brake control by which an electric parking brake as the braking apparatus is to be actuated.

5. The control apparatus according to claim 1, wherein the driver assistance operation includes an intelligent parking-assisting operation, an automatic parking operation and/or a cruise controlling operation.

6. The control apparatus according to claim 1, wherein the driver assistance operation includes an intelligent parking-assisting operation and/or an automatic parking operation.

7. The control apparatus according to claim 6, wherein the driver assistance operation further includes a cruise controlling operation.

* * * * *